United States Patent
Srivastava et al.

(10) Patent No.: US 12,277,236 B2
(45) Date of Patent: Apr. 15, 2025

(54) SYSTEM AND METHODS FOR INTELLIGENT ENTITY-WIDE DATA PROTECTION

(71) Applicant: BANK OF AMERICA CORPORATION, Charlotte, NC (US)

(72) Inventors: Prashant Ranjan Srivastava, Charlotte, NC (US); Michelle Andrea Boston, Richardson, TX (US); Kamalanathan Jeganathan, Karnataka (IN); Aravind Chandramohan Kumar, Kerala (IN); Miriam Levinsohn, Dallas, TX (US); Annabelle Williamson McLemore, Plano, TX (US); Catharina Rabie, Greenville, TX (US); Ananth Rajagopalan, Scarborough (CA); Parthiban Tiruvayur Shanmugam, Charlotte, NC (US); Durga P. Turaga, Murphy, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 492 days.

(21) Appl. No.: 17/494,907

(22) Filed: Oct. 6, 2021

(65) Prior Publication Data
US 2023/0105207 A1    Apr. 6, 2023

(51) Int. Cl.
G06F 21/60    (2013.01)
G06F 16/906    (2019.01)

(52) U.S. Cl.
CPC .......... *G06F 21/604* (2013.01); *G06F 16/906* (2019.01)

(58) Field of Classification Search
CPC .............................. G06F 21/604; G06F 16/906
(Continued)

(56) References Cited

U.S. PATENT DOCUMENTS

| 7,439,847 B2 | 10/2008 | Pederson |
| 7,606,790 B2 | 10/2009 | Levy |

(Continued)

FOREIGN PATENT DOCUMENTS

| CN | 110019176 A | * | 7/2019 | .......... G06F 16/215 |
| CN | 111192015 A | * | 5/2020 | |

(Continued)

OTHER PUBLICATIONS

Shahzad, Raja Khurram, and Niklas Lavesson. Detecting scareware by mining variable length instruction sequences. IEEE, 2011. (Year: 2011).*

(Continued)

*Primary Examiner* — Luu T Pham
*Assistant Examiner* — Walter J Malinowski
(74) *Attorney, Agent, or Firm* — Moore & Van Allen PLLC; Nicholas C. Russell

(57) ABSTRACT

Embodiments of the invention are directed to systems, methods, and computer program products for identifying sensitive, or non-publicly available, information, reclassifying identified sensitive information, and managing access to identified sensitive information in an intelligent and dynamic manner. In some embodiments, the systems and methods described herein utilize a pattern recognition engine designed to analyze and detect identifying characteristics of sensitive data or private data characteristics. The system may also employ an automated response and reporting capability to automatically re-classify sensitive data and apply appropriate protection measures in a multi-platform approach.

15 Claims, 4 Drawing Sheets

(58) Field of Classification Search
USPC .......................................................... 726/26
See application file for complete search history.

(56) References Cited

U.S. PATENT DOCUMENTS

| | | | |
|---|---|---|---|
| 8,468,244 B2 | 6/2013 | Redlich et al. | |
| 8,726,369 B1* | 5/2014 | Emigh | G06F 21/70 |
| | | | 713/182 |
| 8,832,784 B2 | 9/2014 | Budko et al. | |
| 9,218,376 B2 | 12/2015 | Muller et al. | |
| 9,412,142 B2 | 8/2016 | Pederson | |
| 9,602,548 B2 | 3/2017 | Deninger et al. | |
| 10,191,974 B2 | 1/2019 | Indeck et al. | |
| 10,354,472 B2* | 7/2019 | Kuklinski | G06V 30/414 |
| 10,614,689 B2 | 4/2020 | Bess et al. | |
| 10,812,531 B2 | 10/2020 | Narayanaswamy et al. | |
| 10,817,619 B1* | 10/2020 | Kolli | G06F 21/552 |
| 10,938,723 B2 | 3/2021 | Thanasekaran | |
| 10,958,663 B2 | 3/2021 | Simons | |
| 11,102,221 B2 | 8/2021 | Watson et al. | |
| 2006/0048224 A1* | 3/2006 | Duncan | G06F 21/6218 |
| | | | 726/22 |
| 2008/0021828 A1* | 1/2008 | Pfeiffer | G06Q 20/108 |
| | | | 705/42 |
| 2010/0223576 A1 | 9/2010 | Serra et al. | |
| 2016/0070583 A1 | 3/2016 | Chamberlain et al. | |
| 2016/0212166 A1* | 7/2016 | Henry | G06F 21/604 |
| 2018/0082079 A1 | 3/2018 | Burckard | |
| 2018/0191730 A1* | 7/2018 | Deters | G06F 21/552 |
| 2018/0350180 A1* | 12/2018 | Onischuk | G07C 13/00 |
| 2019/0108360 A1 | 4/2019 | Iyer et al. | |
| 2019/0213498 A1 | 7/2019 | Adjaoute | |
| 2020/0050966 A1* | 2/2020 | Enuka | G06Q 10/10 |
| 2020/0193666 A1 | 6/2020 | Cinnamon et al. | |
| 2021/0004486 A1* | 1/2021 | Adams | G06F 21/604 |
| 2021/0110037 A1* | 4/2021 | Hunt | G06F 21/554 |
| 2021/0150056 A1* | 5/2021 | Vax | G06F 16/285 |
| 2021/0271553 A1 | 9/2021 | Mutha et al. | |
| 2021/0287156 A1* | 9/2021 | Rogynskyy | G06Q 10/1095 |
| 2021/0374163 A1* | 12/2021 | Wang | G06F 11/3428 |

FOREIGN PATENT DOCUMENTS

| | | | | |
|---|---|---|---|---|
| WO | WO-0193132 A1 * | 12/2001 | | G06Q 10/10 |
| WO | WO-2009073032 A1 * | 6/2009 | | G06F 17/30011 |

OTHER PUBLICATIONS

Park, Youngja, Wilfried Teiken, Josyula R. Rao, and S. N. Chari. "Data classification and sensitivity estimation for critical asset discovery." IBM Journal of Research and Development 60, No. 4 (2016): 2-1. (Year: 2016).*

Wolthusen, Stephen D. "Molehunt: Near-line semantic activity tracing." in Proceedings from the Sixth Annual IEEE SMC Information Assurance Workshop, pp. 410-418. IEEE, 2005. (Year: 2005).*

* cited by examiner

SYSTEM AND METHODS FOR INTELLIGENT ENTITY-WIDE DATA PROTECTION

FIELD

The present invention generally relates to the field of dynamic solutions for entity-wide, end-to-end data management and protection.

BACKGROUND

With the increased use of remote services for management of resources and sensitive data, there is a need for systems and methods which aid in identifying sensitive information, reclassifying identified sensitive information, and managing access to identified sensitive information in an intelligent and dynamic manner.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing an innovative solution for identifying sensitive information, identifying data protection methods or systems currently in place at the time of identification of sensitive information, identifying and providing acknowledgement of any protective deficiencies, and aiding in managing of the identified sensitive information by generating and communicating recommendations in an intelligent and dynamic manner. It is understood that the that the system may interact with and analyze data in a number of different formats and from a number of sources, including structured and unstructured data format (e.g., free form text, database tables or objects, file system objects, log files, or the like). In some embodiments, the systems and methods described herein utilize a recognition or discovery engine designed to analyze and detect identifying characteristics of sensitive data or private data characteristics using a three layered discovery method or operation comprising a first pass metadata scan, followed by an exemplary quick scan, and finally a deep scan, resulting in a robust finding regarding the sensitivity of the data contained within a file, object, or the like, and the protection necessary to meet entity or industry standards.

For instance, in some embodiments, systems and methods described herein may provide an integrated, end-to-end solution for orchestrating data access, data discovery, active protection, and remediation or reporting across an entity using a single workflow. The invention may leverage artificial intelligent (AI) and machine learning (ML), as well as dynamic application programming interface (API) to provide automated decisioning in labeling a privacy level for data on a granular level field-by-field manner. The system generates and stores a unique sensitive data manifest on an application by application basis which via a holistic, automated, and continuous sensitive data scan across one or more application data stores. Additionally, the system may provide a rating for the one or more applications, which is a measure of the potential each of the one or more applications carries from user information security or data privacy standpoint. This rating aids the entity utilizing the system in generating data protection and management policies specific to each of the one or more applications, and integrate these policies at an entity-wide scale. It is understood that the system of the invention utilizes a process for machine learning detection by continuously analyzing received data in order to identify relevant patterns and characteristics based on known data fields that include sensitive user data in order to automatically and intelligently identify data fields which contain such data. By analyzing and identifying how changing data over time affects the output of machine learning models, the system is able to project and account for data fluctuations, and may proactively adapt for variable data input to improve the integrity and accuracy of machine learning models.

Embodiments of the invention relate to systems, methods, and computer program products for receive a data set for analysis, wherein the data set comprises multiple data files; determine a data type and data format of the data set; based on a scan of metadata of the data set, determine an associated application identification, storage location, and current classification status for the data set; perform a sample scan of one or more of the multiple data files of the data set and determine a data field sampling; perform a full scan of the data set and determine a classification of the data fields in each of the multiple data files via a machine learning engine; based on the classification of the data fields in each of the multiple data files, determine one or more protection requirements; retrieve the associated application identification and generate a report of classifications and protection requirements for the application identification; and transmit the report to one or more user devices via one or more channels of communication.

In some embodiments, the data type further comprises structured or unstructured data.

In other embodiments, the classification further comprises a determination as to whether the data is public or private information.

In further embodiments, the one or more protection requirements further comprise a determination as to whether the data fields should be redacted, obfuscated, partially obfuscated, or encrypted according to one or more entity policies.

In still further embodiments, the report further comprises a displayable option to one or more users to implement the protection requirements for the application identification and other data sets with the same application identification.

In some embodiments, the sample scan further comprises using affinity matching, context checking, or format matching to identify potentially sensitive information within the data fields.

In other embodiments, the invention is further configured to: receive instructions from the one or more user devices, wherein the instructions comprise commands to automatically implement the protection requirements for all future data sets with the same application identification.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
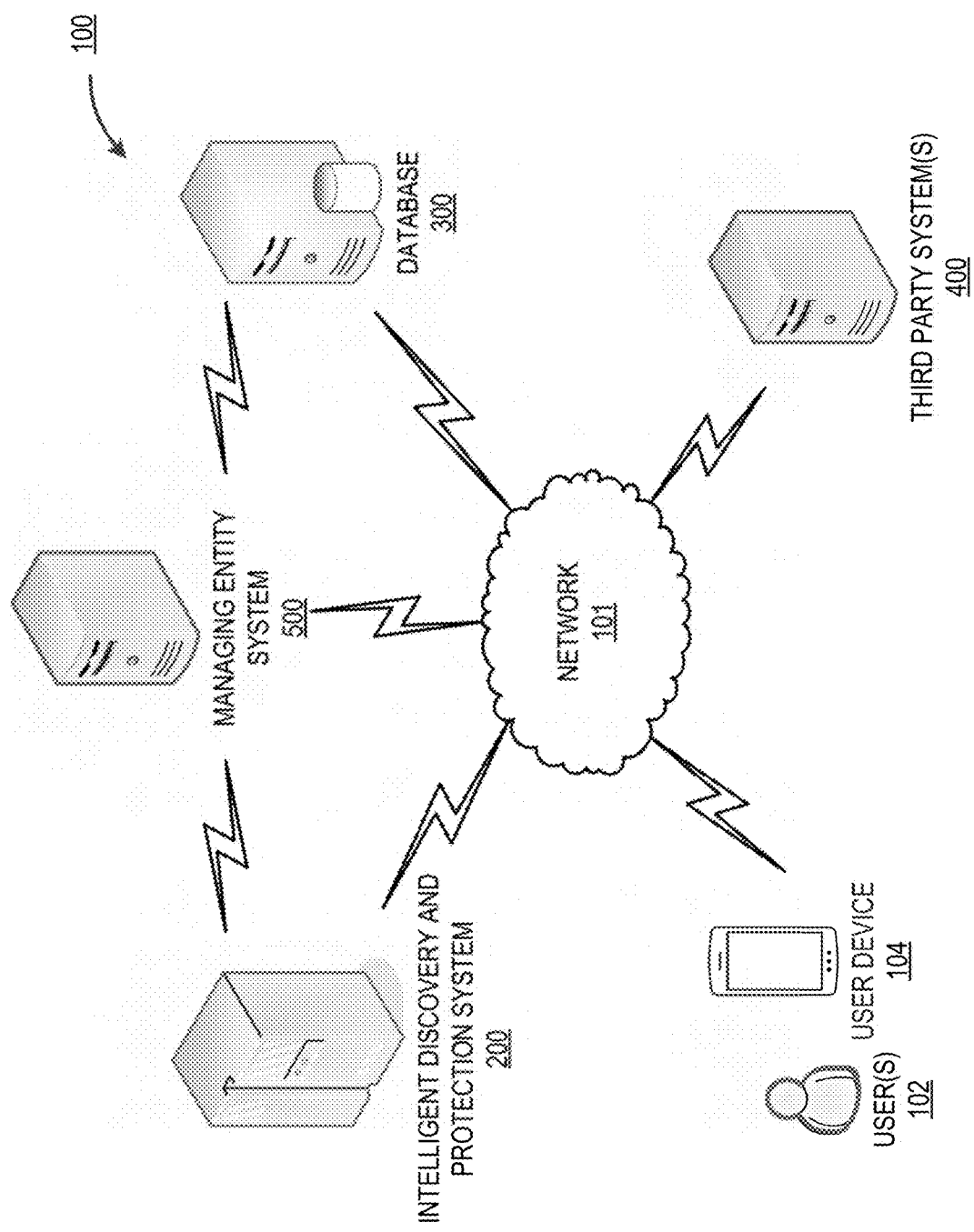
Figure 2:
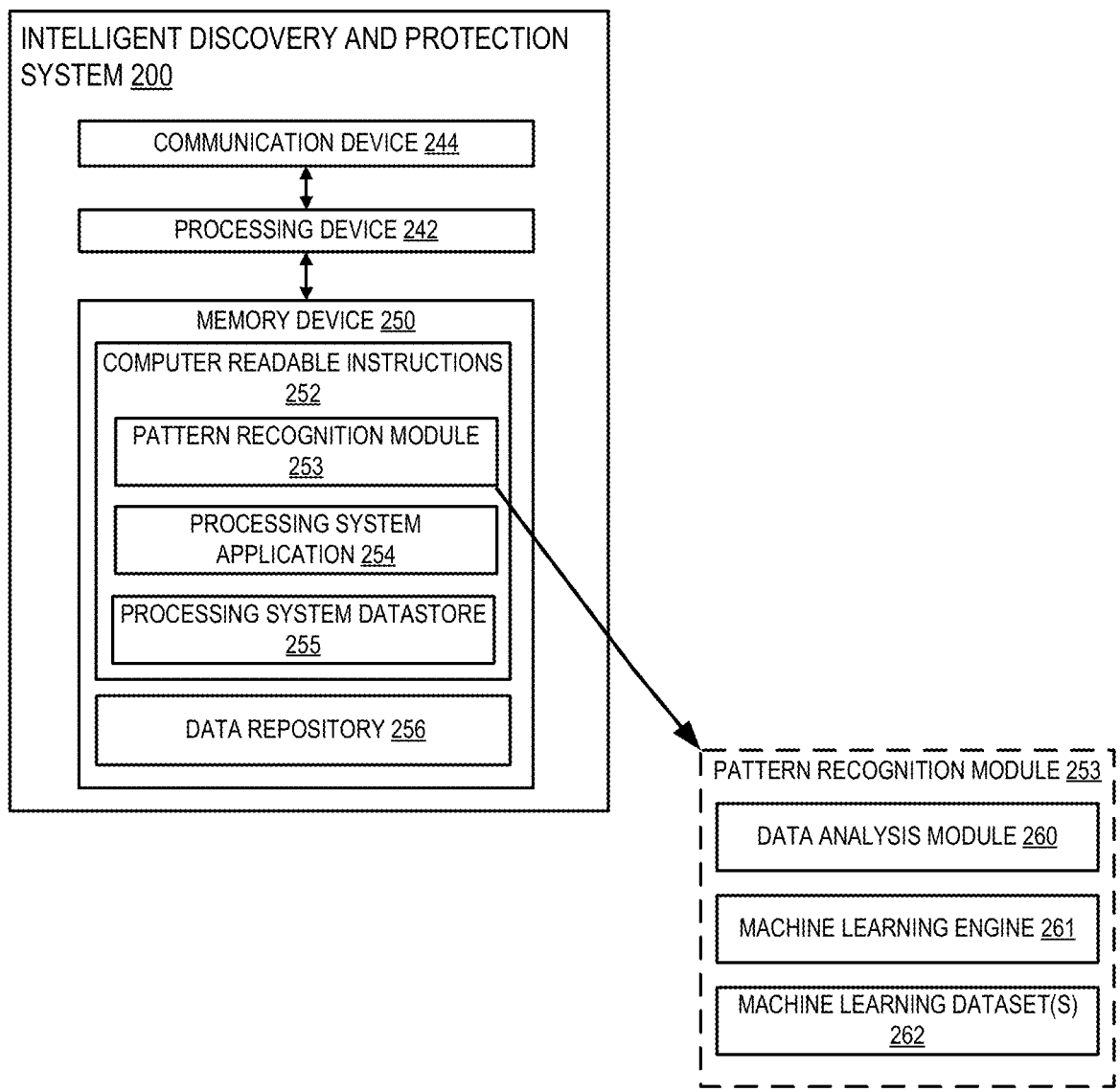
Figure 3:
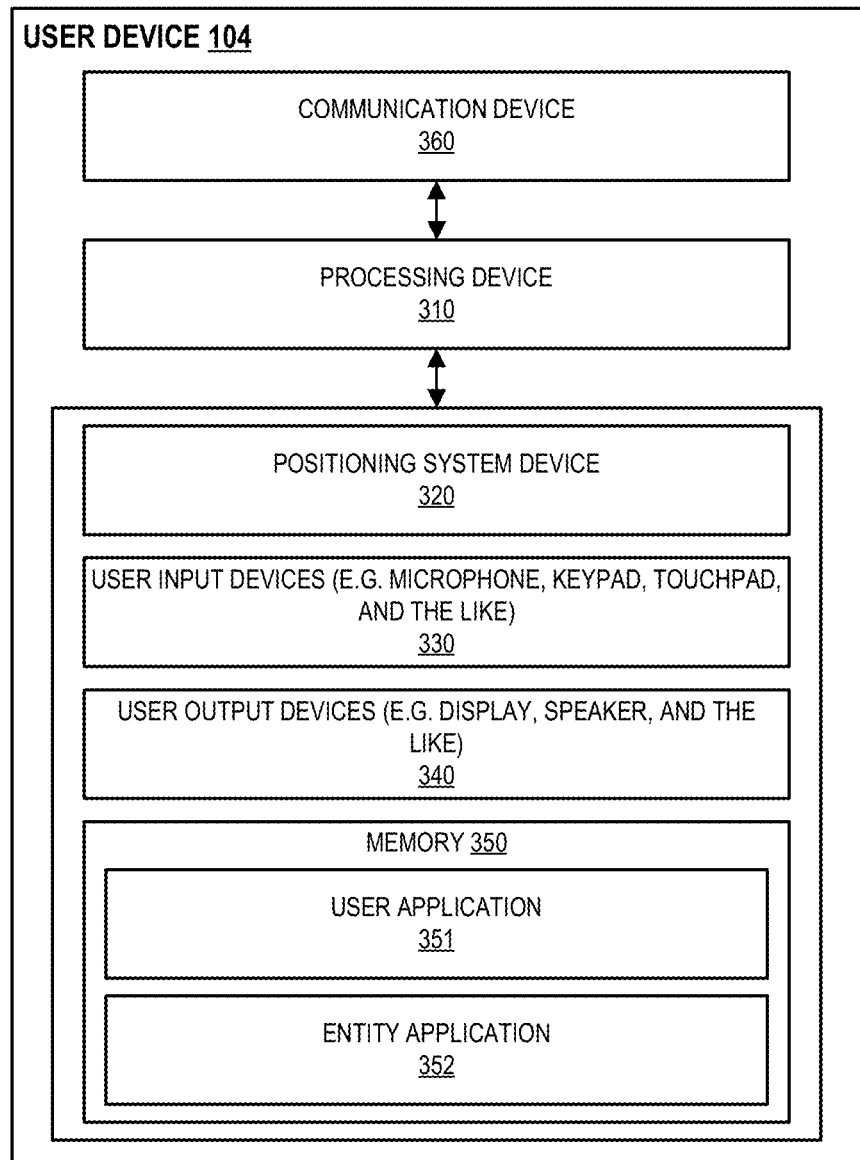
Figure 4:
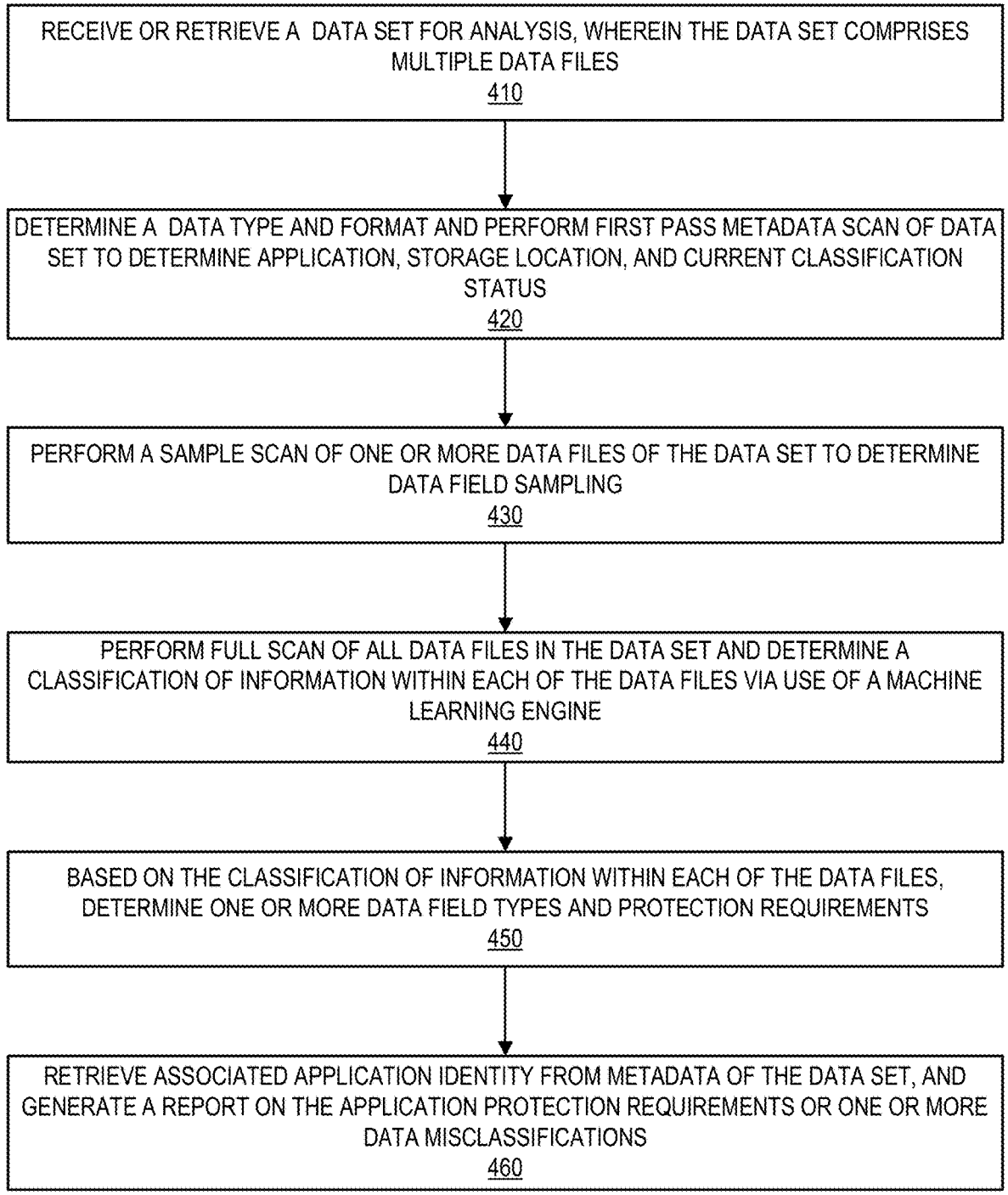

Having thus described embodiments of the invention in general terms, reference will now be made to the accompanying drawings, wherein:

FIG. 1 illustrates a system environment for intelligent entity-wide data protection, in accordance with one embodiment of the present disclosure;

FIG. 2 is a block diagram illustrating components of the intelligent detection system, in accordance with one embodiment of the present disclosure;

FIG. 3 is a block diagram illustrating a user device associated with the intelligent detection system, in accordance with one embodiment of the present disclosure; and FIG. 4 is a flow diagram illustrating a process for intelligent entity-wide data protection, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

"Sensitive data" as used herein may refer to any data which is subject to an entity-based or policy-based rule for protection or heightened security or limited access.

The system allows for use of a machine learning engine to intelligently identify patterns in received resource transaction data. The machine learning engine may be used to analyze historical data in comparison to real-time received transaction data in order to identify transaction patterns or potential issues. The machine learning engine may also be used to generate intelligent aggregation of similar data based on metadata comparison resource transaction characteristics, which in some cases may be used to generate a database visualization of identified patterns similarities.

FIG. 1 illustrates an operating environment for proactive protection against malfeasant data collection, in accordance with one embodiment of the present disclosure. As illustrated, the operating environment 100 may comprise a user 102 and/or a user device 104 in operative communication with one or more third party systems 400 (e.g., web site hosts, registry systems, financial entities, third party entity systems, or the like). The operative communication may occur via a network 101 as depicted, or the user 102 may be physically present at a location separate from the various systems described, utilizing the systems remotely. The operating environment also includes a managing entity system 500, intelligent discovery and protection system 200, a database 300, and/or other systems/devices not illustrated herein and connected via a network 101. As such, the user 102 may request information from or utilize the services of the intelligent discovery and protection system 200, or the third party system 400 by establishing operative communication channels between the user device 104, the managing entity system 500, and the third party system 400 via a network 101.

Typically, the intelligent discovery and protection system 200 and the database 300 are in operative communication with the managing entity system 500, via the network 101, which may be the internet, an intranet, or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (e.g., a smart phone or mobile phone, or the like), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain resource account data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the intelligent discovery and protection system 200 and database 300 via a private communication channel. The private communication channel may be via a network 101 or the intelligent discovery and protection system 200 and database 300 may be fully integrated within the managing entity system 500, such as a virtual private network (VPN), or over a secure socket layer (SSL).

The managing entity system 500 may communicate with the intelligent discovery and protection system 200 in order to transmit data associated with observed or received data from or via a plurality of third party systems 400. In some embodiments, the managing entity system 500 may utilize the features and functions of the intelligent discovery and protection system 200 to initialize advisory measures in response to identifying data protection deficiencies. In other embodiments, the managing entity and/or the one or more third party systems 400 may utilize the intelligent discovery and protection system 200 to react to identified trends, patterns, or potential issues.

FIG. 2 illustrates a block diagram of the intelligent discovery and protection system 200 associated with the operating environment 100, in accordance with embodiments of the present invention. As illustrated in FIG. 2, the intelligent discovery and protection system 200 may include a communication device 244, a processing device 242, and a memory device 250 having a pattern recognition module 253, a processing system application 254 and a processing system datastore 255 stored therein. As shown, the processing device 242 is operatively connected to and is configured to control and cause the communication device 244, and the memory device 250 to perform one or more functions. In some embodiments, the pattern recognition module 253 and/or the processing system application 254 comprises computer readable instructions that when executed by the processing device 242 cause the processing device 242 to perform one or more functions and/or transmit control instructions to the database 300, the managing entity system 500, or the communication device 244. It will be understood that the pattern recognition module 253 or the processing system application 254 may be executable to initiate, perform, complete, and/or facilitate one or more portions of any embodiments described and/or contemplated herein. The pattern recognition module 253 may comprise executable instructions associated with data processing and analysis and may be embodied within the processing system application 254 in some instances. The intelligent discovery and protection system 200 may be owned by, operated by and/or affiliated with the same managing entity that owns or operates the managing entity system 500. In some embodiments, the intelligent discovery and protection system 200 is fully integrated within the managing entity system 500.

It is further understood that the intelligent discovery and protection system 200 is also scalable, meaning the it relies on multi-nodal system for batch processing, data retrieval, reporting, or the like. As such, the intelligent discovery and protection system 200 may be upgraded by adding or reducing the number of nodes active within the system in order to optimize efficiency and speed. In some embodiments, the multi-nodal nature of the system may also add to the integrity of the system output, where various machine learning models may be applied via different nodes on the same data set, and later analyzed against one another to determine a consensus or optimize the accuracy of data reporting. A multi-nodal approach also allows the intelligent discovery and protection system 200 to be less vulnerable. For instance, each node may be schedule for maintenance at different intervals to avoid total system downtime, and each node may be taken offline in the event of a node failure without compromising access to the system's capabilities.

The pattern recognition module 253 may further comprise a data analysis module 260, a machine learning engine 261, and a machine learning dataset(s) 262. The data analysis module 260 may store instructions and/or data that may cause or enable the intelligent discovery and protection system 200 to receive, store, and/or analyze data received by the managing entity system 500 or the database 300, as well as generate information and transmit responsive data to the managing entity system 500 in response to one or more requests or via a data stream between the intelligent discovery and protection system 200 and the managing entity system 500. The data analysis module may pre-process data before it is fed to the machine learning engine 261. In this way, the intelligent discovery and protection system 200 may exercise control over relevance or weighting of certain data features, which in some embodiments may be determined based on a metadata analysis of machine learning engine 261 output over time as time-dependent data is changed.

For instance, in some embodiments, the data analysis module may receive a number of data files containing metadata which identifies the files as originating from a specific source application, containing certain data fields or classifications of data privacy, or the like, and may package this data to be analyzed by the machine learning engine 261, as well as store the files in a catalog of data files in the data repository 256 or database 300 (e.g., files may be catalogued according to any metadata characteristic, including descriptive characteristics such as source, identity, content, data field types, or the like, or including data characteristics such as file type, size, encryption type, obfuscation, access rights, or the like). The machine learning engine 261 and machine learning dataset(s) 262 may store instructions and/or data that cause or enable the intelligent discovery and protection system 200 to generate, based on received information, new output in the form of prediction, current status, analysis, or the like of one or more communications, network activity data streams, or data field patterns. In some embodiments, the machine learning engine 261 and machine learning dataset(s) 262 may store instructions and/or data that cause or enable the intelligent discovery and protection system 200 to determine recommended actions, classifications, encryptions, redactions, access limitations, or prophylactic actions to be taken to benefit one or more specific users or systems for their protection or privacy.

The machine learning dataset(s) 262 may contain data queried from database 300 or may be extracted or received from third party systems 400, managing entity system 500, or the like, via network 101. The database 300 may also contain metadata, which may be generated at the time of data creation, onboarding to the managing entity system 500 or intelligent discovery and protection system 200, or in some cases may be generated specifically by the data analysis module 260. In some cases, the metadata may include statistics regarding the data fields in each data set, which may be stored in a separate tabular dataset and tracked over a certain temporal period, such as a day, month, multi-month period, or the like, in order to provide the capability for meta-analysis on how data features affect modeling over time.

In some embodiments, the machine learning dataset(s) 262 may also contain data relating to user activity or device information, which may be stored in a user account managed by the managing entity system. In some embodiments, the machine learning engine 261 may be a single-layer recurrent neural network (RNN) which utilizes sequential models to achieve results in audio and textual domains. Additionally, the machine learning engine 261 may serve an alternate or dual purpose of analyzing user resource account history, user preferences, user interests, user device activity history, or other user submitted or gathered data from managing entity system 500, third party system 400, or the like, in order to generate predictions as to the statistical certainty that certain interactions, user device behavior, user communications, or the like, may be a malfeasant attempt to gain access or control one or more user devices or accounts. For instance, the machine learning engine may consist of a multilayer perceptron neural network, recurrent neural network, or a modular neural network designed to process input variables related to one or more user characteristics and output recommendations or predictions. Given the nature of the managing entity system 500, particularly in embodiments where the managing entity system 500 is a financial institution, the machine learning engine 261 may have a large dataset of user account information, resource transaction information, account resource amount information, communication information, data on known malfeasant actors, data on known patterns of malfeasant attempts to gain unauthorized access, or the like, from which to draw from and discern specific patterns or correlations in device behavior, network communications between devices, or the like. It is understood that such data may be anonymized or completely stripped of personal identifying characteristics of specific users in preferred embodiments, with no negative impact the system's ability to generate accurate output or prediction data given certain variables.

In further embodiments, the machine learning engine 261 may have one or more data sets containing user account information, user communication pattern information, resource transaction information, account resource amount information, account access information, user authorization information, situational data, user interaction information, or the like, from which to draw from and discern specific patterns or correlations related to account security, system security, or the like. For instance, the machine learning engine 261 may be trained on a large dataset of exemplary data in order to based its determinations on (e.g., the machine learning engine 261 may adapt over time to accurately and precisely identify data fields within data sets that contain account numbers, social security numbers, usernames, passwords, or the like). As such, it is imperative that the machine learning engine 261 operate in an accurate and predictable manner, and the model must have the capability to dynamically adapt over time in response to changing data characteristics. However, if one feature set of the incoming data stream is skewing the output of the machine learning engine 261, it is necessary for the system to discern if the skew is natural or otherwise perhaps an intentionally levied method against the system in order to train the model to react to patterns or characteristics in a certain way. In such situations, the analysis of metadata in conjunction with machine learning output in order to identify feature sets which have the highest degree of impact on machine learning output over time may be most crucial, and the machine learning mode may need to be adjusted accordingly.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the intelligent discovery and protection system 200, the user device 104, other processing systems, data systems, etc. Additionally, the processing device 242 may generally refer to a device or combination of devices having circuitry used for implementing the communication and/or logic functions of the intelligent discovery and protection system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the intelligent discovery and protection system 200 may be allocated between these processing devices according to their respective capabilities. The processing device 242 may further include functionality to operate one or more software programs based on computer-executable program code 252 thereof, which may be stored in a memory device 250, such as the processing system application 254 and the pattern recognition module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the intelligent discovery and protection system 200 may generally refer to a device or combination of devices that store one or more forms of computer-readable media for storing data and/or computer-executable program code/instructions. For example, the memory device 250 may include any computer memory that provides an actual or virtual space to temporarily, or permanently, store data and/or commands provided to the processing device 242 when it carries out its functions described herein.

FIG. 3 is a block diagram illustrating a user device associated with the intelligent detection system, in accordance with one embodiment of the present disclosure. The user device 104 may include a user mobile device, desktop computer, laptop computer, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices. The user device 104 may generally include a processing device or processor 310 communicably coupled to devices such as, a memory device 350, user output devices 340 (for example, a user display or a \speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, an entity application 352, or a web browser application. The user application 351 or the entity application may then allow the user device 104 to transmit and receive data and instructions to or from the third party system 400, intelligent discovery and protection system 200, and the managing entity system 500, and display received information via the user interface of the user device 104. The user application 351 may further allow the user device 104 to transmit and receive data to or from the managing entity system 500 data and instructions to or from the intelligent discovery and protection system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the intelligent discovery and protection system 200 may be accessed by multiple different entities, it may be configured to present information according to the preferences or overall common themes or branding of each entity system of third party system. In this way, each system accessing the intelligent discovery and protection system 200 may use a unique aesthetic for the entity application 352 or user application 351 portal.

The processor 310 may be configured to use the communication device 360 to communicate with one or more devices on a network 101 such as, but not limited to the third party system 400, the intelligent discovery and protection system 200, and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker or other audio device, which are operatively coupled to the processor 310 and allow the user device to output generated audio received from the intelligent discovery and protection system 200. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 350 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the intelligent discovery and protection system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a flow diagram illustrating a process for intelligent entity-wide data protection, in accordance with one embodiment of the present disclosure. As shown in block 401, the process begins wherein the system receives a data set or retrieves the data set from storage for analysis. It is understood that the system may handle data sets containing multiple data files in any number of formats from any number of existing applications or datastores, including data files in both structured and unstructured formats. In this way, the system may interact with one or more entity systems 500, third party systems 400, or the like, and the various applications and associated data formats thereon. For example, in some embodiments, the system may receive data files in an unstructured format such as data typed in by a user in a chat window, terminal window, comment box, description field, or the like, such as in the instance of a user acting in a customer support capacity, as a customer onboarding assistant, or the like (e.g., the user may be interacting with one or more customers via a text-based chat function, or may be recording notes during an interaction with the customer, or the like). In other embodiments, the system may receive or record data in a structured format, such as via a relational database management system (RDMS), structured form document with pre-programmed information fields, spreadsheet, or the like (e.g., a user may fill out a user data configuration including their basic background information, contact information, resource account information, user preferences, or the like).

As shown in block 420, the initial step in analyzing received data set is determining a data type and format and performing a first pass metadata scan of the data files in the data set to various information about the data files. For instance, the system may determine the application that created or uses the data files ("associated application"), storage location of the data files, storage method of the data files (encrypted, unencrypted, obfuscated, partially obfuscated, tokenized, or the like), and the current classification status of the data files or data within the data files (e.g., the data files may be classified as sensitive or private data, and may carry permissioned or role-based access privileges wherein only certain users or types of user may access the data within the files, or the like). The structure and format of the data files may inform the process of analyzing the information in some embodiments. For instance, the data analysis module 260 may perform an initial first pass scan of the metadata of the received data and determine a particular file format for the data, form structure of the data (customer form or customer application, or the like), and determine that a deep scan of the received data should be performed by the machine learning engine 261 according to that known format or structure in order to expedite the process. By using a multi-step approach to scanning received data, the system is able to intelligently optimize the efficiency of the analysis of received information by anticipating the nature of the structure, format, order, or substance expected within the received data ahead of time.

As shown in block 430, the next step in analyzing the data files is to perform a sample scan of one or more data files of the data set. The system may identify more information that may not have been previously deduced by the system via the first pass metadata scan, including the actual contents of one or more data files, the type of data contained within the one or more data files (e.g., anonymized account data versus personally identifiable data, or the like), or the general structure and format of the one or more data files.

The results of this sample scan can inform the next step in the process, which is the full scan of all data files in the data set ("deep scan"), wherein the system may employ the use of a selected machine learning engine, such as machine learning engine 261, in order to batch process the data files and determine what types or classifications of information contained within the data files, as shown in block 440. In some embodiments, batch processing of data at rest is preferred due to the lower likelihood of causing any interaction failures with other active applications. As the system performs the full scan of the data files, it may employ an optical character recognition (OCR) scan of a data file that contains information in a non-text-based format, and generate a searchable metadata file for the data file such that the data identified within the data file can be located or later classified. In some embodiments, if the sample scan of the data files indicated that they may contain resource account information, the selected machine learning engine may generate a classification for certain information based on affinity matching of resource account information (e.g., certain data patterns containing 16 digits and followed by 4 alphanumeric characters may be classified as being a payment instrument number and expiration date, or the like). In other embodiments, the machine learning engine 261 may use context of nearby data to inform classification of information (e.g., the system may use checksums, format matching, or the like to identify a social security number and date of birth, or the like). In still further embodiments, the machine learning engine 261 may anticipate one or more information classifications as present based on already identified or classified data points. For instance, the machine learning engine 261 may identify that a "username" field is present, and may conduct a search in the document for potential username/password combinations.

In some embodiments, the presence of certain combinations of data may inform the classification of the data file as a whole. As shown in block 450, based on the classification of information within each of the data files of the data set, the system may determine one or more data field types and protection requirements associated therewith. For instance, if a data file contains both a username and password, the data file may require scrambling and encryption to separate the data files since the combination of both the username and password could lead to a catastrophic security compromise. In other embodiments, the data file may require certain access privileges, and the privileges may be applied in a tiered manner. For instance, if one or more data files contain social security numbers, the data file may only be fully visible to an account holder, such as the customer, whereas a user or employee with access privileges of a service representative may require access to a redacted or partially obfuscated data file only showing the last four digits of the social security number to aid in customer verification during support or advising sessions. In this way, the system may apply a dynamic classification to one or more data files, wherein the one or more data files are fully encrypted while at rest, but certain portions of the data files are decrypted depending on the user accessing the data files or the application used to access the data files.

The classification may also be informed by the metadata identified in step 420. For example, the access permission or privileges of the application(s) using the data file may inform the classification of the information within the associated data files. In some embodiments, all information may be encrypted while at rest, but only certain applications with limited access permission privileges may have access to decrypted data files (e.g., a customer portal may allow a customer to verify themselves via a multifactor authentication technique and gain full access to their account information during a verified session, while a service representative using the managing entity system 500 may only have access to partially decrypted data files, partially redacted view of account information, or the like).

It is understood that the system can encrypt each field of information in one or more data files in order to mask, redact, or completely remove data in an intelligent fashion using field-level encryption techniques. For instance, if certain data fields within a single data files are classified as highly sensitive in nature, but the data file requires access at a later time, the system may intelligently mask or obfuscate portions of the data during access, while fully encrypting the data file as a whole while at rest (e.g. a teller may access a customer account file and require the customer to confirm the last four digits of a of their social security number, account number, or the like).

As shown in block 460, the system may retrieve associated application identity from the metadata of the data set, and generate a report on the application protection requirements or one or more data misclassifications or protection deficiencies within the data set. The system may send an automated notification via one or more channels of communication (e.g., email, internal secure messaging service of the entity system 500, or the like), and allow one or more authorized users to review, acknowledge, and respond to the system's findings. In some embodiments, the system may maintain a programmed list of contacts associated with each application in order to dynamically notify the relevant users who have permissioned access or administrative capacity over the analyzed data set. In other embodiments, the system may be programmed to only alert a small team of users of each report, such as in instances where there is an isolated group of administrators or information technology professionals tasked with implementing the security protocols of the managing entity system 500.

In some embodiments, the report may contain a summary of the previous classifications of data fields identified within the data set, currently employed data security protocols, a summary of misclassified data fields, recommended re-classifications for one or more data fields, or a summary of automated re-classification of sensitive data fields identified which required additional protection. In some embodiments the security protocol of re-classifying and protecting identified data is automated; however, each report package may be generated independently such that one or more users may review or make changes to the automatically applied re-classification protocols or investigate further if a particular data set included a relatively high number of re-classifications versus other reports, or based on the user's knowledge of other reports. In addition to supporting an array of data types and formats (structured and unstructured), the system is also designed for multi-platform support. For instance, in some embodiments, the system may be linked to a malfeasance detection and ticketing tool, or any other related notification, reporting, or incident response tool in order to create an integrated platform and solution for identifying, classifying, and protecting data at rest and managing permissioned access to such data. It is further understood that the system is also scalable, meaning the it relies on multi-nodal system for batch processing, data retrieval, reporting, or the like. As such, the system may be upgraded by adding or reducing the number of nodes active within the system in order to optimize efficiency and speed. In some embodiments, the multi-nodal nature of the system may also add to the integrity of the system output, where various machine learning models may be applied via different nodes on the same data set, and later analyzed against one another to determine a consensus or optimize the accuracy of data reporting. A multi-nodal approach also allows the system to be less vulnerable. For instance, each node may be schedule for maintenance at different intervals to avoid total system downtime, and each node may be taken offline in the event of a node failure without compromising access to the system's capabilities.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent entity-wide data classification and protection, the system comprising:
   a memory device; and
   a processing device operatively coupled to the memory device, wherein the processing device is configured to execute computer-readable program code to:
   receive a data set for analysis, wherein the data set comprises multiple data files;
   determine a data type and data format of the data set;
   based on a scan of metadata of the data set, determine an associated application identification, storage location, and current classification status for the data set;
   perform a sample scan of one or more of the multiple data files of the data set and determine a data field sampling, wherein the sample scan further comprises using affinity matching, context checking, or format matching to identify potentially sensitive information within the data fields that was not identified via the scan of the metadata of the data set;
   perform a full scan of the data set resulting from the simple scan and determine a classification of the data fields in each of the multiple data files via a machine learning engine;
   utilize a three-layered discovery method comprising a first pass metadata scan, a quick scan, and a deep scan to detect identifying characteristics of private data characteristics;
   based on the classification of the data fields in each of the multiple data files, determine one or more protection requirements and label the data fields with corresponding privacy levels;
   retrieve the associated application identification and generate a report of classifications and protection requirements for the application identification;

transmit the report to one or more user devices via one or more channels of communication; and apply field-level encryption techniques to implement one or more protection requirements to protect sensitive data based on user access levels, wherein the one or more protection requirements further comprise a determination as to whether the data fields should be redacted, obfuscated, partially obfuscated, or encrypted according to one or more entity policies.

2. The system of claim 1, wherein the data type further comprises structured or unstructured data.

3. The system of claim 1, wherein the classification further comprises a determination as to whether the data is public or private information.

4. The system of claim 1, wherein the report further comprises a displayable option to one or more users to implement the protection requirements for the application identification and other data sets with the same application identification.

5. The system of claim 1, further configured to:

receive instructions from the one or more user devices, wherein the instructions comprise commands to automatically implement the protection requirements for all future data sets with the same application identification.

6. A computer program product for intelligent entity-wide data classification and protection, the computer program product comprising at least one non-transitory computer readable medium comprising computer readable instructions, the instructions comprising instructions for:

receive a data set for analysis, wherein the data set comprises multiple data files;

determine a data type and data format of the data set;

based on a scan of metadata of the data set, determine an associated application identification, storage location, and current classification status for the data set;

perform a sample scan of one or more of the multiple data files of the data set and determine a data field sampling, wherein the sample scan further comprises using affinity matching, context checking, or format matching to identify potentially sensitive information within the data fields that was not identified via the scan of the metadata of the data set;

perform a full scan of the data set resulting from the simple scan and determine a classification of the data fields in each of the multiple data files via a machine learning engine;

utilize a three-layered discovery method comprising a first pass metadata scan, a quick scan, and a deep scan to detect identifying characteristics of private data characteristics;

based on the classification of the data fields in each of the multiple data files, determine one or more protection requirements and label the data fields with corresponding privacy levels;

retrieve the associated application identification and generate a report of classifications and protection requirements for the application identification;

transmit the report to one or more user devices via one or more channels of communication; and apply field-level encryption techniques to implement one or more protection requirements to protect sensitive data based on user access levels, wherein the one or more protection requirements further comprise a determination as to whether the data fields should be redacted, obfuscated, partially obfuscated, or encrypted according to one or more entity policies.

7. The computer program product of claim 6, wherein the data type further comprises structured or unstructured data.

8. The computer program product of claim 6, wherein the classification further comprises a determination as to whether the data is public or private information.

9. The computer program product of claim 6, wherein the report further comprises a displayable option to one or more users to implement the protection requirements for the application identification and other data sets with the same application identification.

10. The computer program product of claim 6, further configured to:

receive instructions from the one or more user devices, wherein the instructions comprise commands to automatically implement the protection requirements for all future data sets with the same application identification.

11. A computer implemented method for intelligent entity-wide data classification and protection, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a data set for analysis, wherein the data set comprises multiple data files;

determining a data type and data format of the data set;

based on a scan of metadata of the data set, determining an associated application identification, storage location, and current classification status for the data set;

performing a sample scan of one or more of the multiple data files of the data set and determine a data field sampling, wherein the sample scan further comprises using affinity matching, context checking, or format matching to identify potentially sensitive information within the data fields that was not identified via the scan of the metadata of the data set;

performing a full scan of the data set resulting from the simple scan and determine a classification of the data fields in each of the multiple data files via a machine learning engine;

utilizing a three-layered discovery method comprising a first pass metadata scan, a quick scan, and a deep scan to detect identifying characteristics of private data characteristics;

based on the classification of the data fields in each of the multiple data files, determining one or more protection requirements and labelling the data fields with corresponding privacy levels;

retrieving the associated application identification and generate a report of classifications and protection requirements for the application identification;

transmitting the report to one or more user devices via one or more channels of communication; and applying field-level encryption techniques to implement one or more protection requirements to protect sensitive data based on user access levels, wherein the one or more protection requirements further comprise a determination as to whether the data fields should be redacted, obfuscated, partially obfuscated, or encrypted according to one or more entity policies.

12. The computer implemented method of claim 11, wherein the data type further comprises structured or unstructured data.

13. The computer implemented method of claim 11, wherein the one or more protection requirements further comprise a determination as to whether the data fields should be redacted, obfuscated, partially obfuscated, or encrypted according to one or more entity policies.

14. The computer implemented method of claim 11, further comprising:
   receiving instructions from the one or more user devices, wherein the instructions comprise commands to automatically implement the protection requirements for all future data sets with the same application identification.

15. The computer implemented method of claim 11, wherein the classification further comprises a determination as to whether the data is public or private information.

* * * * *